United States Patent [19]

Fujii

[11] Patent Number: 5,295,182

[45] Date of Patent: Mar. 15, 1994

[54] FACSIMILE DEVICE HAVING SELF-DIAGNOSTIC FUNCTION AND MAINTENANCE AND CONTROL METHOD THEREOF

[75] Inventor: Yoshiharu Fujii, Sakurai, Japan

[73] Assignee: Sharp Kabushiki Kaisha, Osaka, Japan

[21] Appl. No.: 612,678

[22] Filed: Nov. 14, 1990

[30] Foreign Application Priority Data

Nov. 20, 1989 [JP] Japan .................. 1-302742
Nov. 20, 1989 [JP] Japan .................. 1-302743
Nov. 20, 1989 [JP] Japan .................. 1-302749

[51] Int. Cl.⁵ .................. H04M 11/00; H04N 1/00
[52] U.S. Cl. .................. 379/100; 358/441; 379/40; 379/106
[58] Field of Search .................. 379/100, 96, 97, 98, 379/94, 39, 40; 358/441

[56] References Cited

U.S. PATENT DOCUMENTS

| | | | |
|---|---|---|---|
| 3,914,539 | 10/1975 | Hashimoto . | |
| 4,613,907 | 9/1986 | Yoshimoto et al. . | |
| 4,717,967 | 1/1988 | Toshida | 379/100 |
| 4,750,917 | 6/1988 | Fujii . | |
| 4,811,234 | 3/1989 | Storace | 379/107 |
| 4,853,864 | 8/1989 | Hart et al. | 379/107 |
| 4,876,606 | 10/1989 | Banno et al. . | |
| 5,019,916 | 5/1991 | Ogura | 358/401 |

FOREIGN PATENT DOCUMENTS 0241255 10/1987 European Pat. Off. .
60-178771 12/1985 Japan .
62-115473 5/1987 Japan .
1-062955 9/1989 Japan .

OTHER PUBLICATIONS

"A Standard Interface between Gateway Switch and Communications Processing Equipment in the INS Model System", *Review of the Electrical Communication Laboratories*, vol. 32, No. 1, 1984.

Primary Examiner—Wing F. Chan
Assistant Examiner—Stella L. Woo

[57] ABSTRACT

Disclosed is a facsimile device and a maintenance and control method thereof, which enable a reduction in time load and economic load of users and that of a maintenance and control station with respect to maintenance and control of the facsimile device. The facsimile device includes a trouble type determining circuit for determining, when a trouble occurs, whether or not the type of the trouble has contents that can be handled by the users. It further includes a control circuit 7 for controlling a sending/receiving circuit 7, when trouble type determining circuit 5 determines that the trouble contents cannot be handled by the users, so as to send the trouble contents to a facsimile unit of the maintenance and control station. Therefore, even when such a trouble occurs that cannot be handled by the user, a fast dealing with the trouble can be easily made, resulting in a reduction in time load and economic load of the user and of the maintenance and control station with respect to the maintenance and control of the facsimile device.

21 Claims, 6 Drawing Sheets

FACSIMILE DEVICE HAVING SELF-DIAGNOSTIC FUNCTION AND MAINTENANCE AND CONTROL METHOD THEREOF

BACKGROUND OF THE INVENTION

1. Field of the Invention

The present invention relates generally to facsimile devices and maintenance and control methods thereof. More particularly, it relates to a facsimile device and a maintenance and control method thereof, in which time loss and work loss occurring in a communication with respect to maintenance and control between users of the facsimile device and a maintenance service station entrusted with the maintenance and control of the facsimile device can be reduced.

2. Description of the Background Art

Recently, facsimile devices which enable an image formation on plain paper by employing a copying process have become popular. A conventional facsimile device often causes trouble due to its mechanism employing such a copying process. Moreover, a sufficient service system of maintenance and control is desired due to necessities of regular overhaul for performance retention. Especially, a rapid and accurate dealing is strongly desired in order to achieve an earlier recovery of the device from the trouble.

The conventional facsimile device per se, in general, detects the condition of itself and causes a display portion of a display or the like to display trouble contents and the expected due data for exchanging specific parts or make a nearly empty display of consumables, thereby to inform users of these requirements. Then, when the users recognize the requirements and determine that it is necessary to call a service man, they communicate with a maintenance service station entrusted with the maintenance and control of the facsimile device by means of telephone or the like. This is a common procedure for users of the conventional facsimile devices.

The means of telephone communication or the like as described above, however, entails the following problems.

That is, the users are forced to spend their working time explaining the trouble contents to the maintenance service station and thus suffer a time loss.

Further, it is possible that the users may incorrectly recognize the display of the trouble contents and inform the maintenance service station of contents different from the actual trouble contents.

In addition, such a case may occur that the users do not notice the trouble contents on a display and thus leave it as it is. In this case, small trouble becomes large trouble.

Moreover, since a service man in the maintenance service station prepares required parts after informed of the trouble contents and then visits the users, a rapid dealing with the trouble cannot be made.

When the trouble contents are not fully understood by the maintenance service station, the service man first visit the users to check the trouble contents and then visits them again with a preparation of necessary parts and the like. In this case, a recovery of the device from the trouble is delayed.

There are other disadvantages than those occurring in the telephone communication in the occurrence of the trouble as described above.

That is, the facsimile device employing the copying process includes, like a normal copier, a photoreceptor for forming an electrostatic latent image of image information, a toner for making the electrostatic latent image visible, a developing agent such as carriers for charging the toner, a transfer paper made of plain paper having a toner image, formed of the toner and the electrostatic latent image, fixed thereon, etc. Accordingly, in this facsimile device, after the surface of the charged photoreceptor is exposed and the electrostatic latent image is formed, a toner image is formed by development employing the toner. This toner image is then transferred onto the transfer paper, so as to obtain image information.

In this manner, communication information can be obtained as image information in the facsimile device. When the device is in repetitive use, the above-described photoreceptor, toner and the like deteriorate and run out. Thus, in the conventional facsimile device, the photoreceptor, toner and the like are determined as consumables. Renewal of these consumables enables a continuous and smooth use of the device.

In the foregoing conventional facsimile device, however, users have to pay attention to the time to exchange the consumables. Further, the users are required to keep the consumables in stock in advance or to communicate with the maintenance service station handling the consumables and to prepare them at the time of exchange.

The consumables are, however, liable to change in quality by an influence of temperature and humidity. Thus, when the users stock the consumables, it is necessary to retain good preservation environments unaffected by temperature and humidity for the consumables.

Further, when the users communicate with the maintenance service station to prepare the consumables, there is a possibility that the facsimile device cannot be used while the consumables are transported from the maintenance service station. In this case, the maintenance service station is also required to control the exchange time of the consumables all the time.

As mentioned above, the conventional facsimile device requires the users to pay attention to the exchange time, the stock and the preparation of the consumables by communication with the maintenance service station. There is a disadvantage that the control of the consumables casts an extra burden in cost and time on the users and the maintenance service station.

A maintenance service contract of a facsimile device includes a spot contract, in which the maintenance service station provides users with service when trouble occurs in the facsimile device and calculates charges for each time of service, and a maintenance contract, in which a unit charge for one printed sheet is accumulated on the number of printed sheets for a control cost. The maintenance contract is often employed due to its excellent maintainability. The maintenance contract has, however, a disadvantage in that a service man has to visit users every month to check the number of printed sheets from a counter of the facsimile device, resulting in an increased labor cost and an increased maintenance and control cost.

SUMMARY OF THE INVENTION

One object of the present invention is to reduce time load and economic load of users a maintenance and control station, for a facsimile device.

Another object of the present invention is to inform a maintenance and control station of correct trouble information for a facsimile device.

A further object of the present invention is to surely inform a maintenance and control station of contents of trouble in a facsimile device, even when users do not recognize occurrence of the trouble.

A still further object of the present invention is to reduce load of users and a maintenance and control station with respect to a control over consumables in a facsimile device.

A still further object of the present invention is to significantly reduce inoperable time due to trouble in a facsimile device.

A still further object of the present invention is to eliminate a waste of time and cost of users and a maintenance and control station in a maintenance and control method of a facsimile device.

A still further object of the present invention is to reduce a labor cost required for a checking of the number of printed sheets in a facsimile device, thereby to reduce a maintenance and control cost thereof.

Briefly, a facsimile device according to a first aspect of the present invention includes a detecting circuit for detecting an operating state of the facsimile device itself, a trouble determining circuit for determining, when the detecting circuit detects occurrence of a trouble, whether or not contents of the trouble can be handled by an operator, and a control circuit for controlling a sending circuit so as to send the contents of the trouble as information to a previously registered communication destination when the trouble determining circuit determines that the trouble contents cannot be handled by the operator.

In operation, when a trouble occurs, the detecting circuit detects the trouble. The trouble determining circuit determines whether or not contents of the trouble can be handled by an operator. When the trouble contents cannot be handled by the operator, the control circuit controls the sending circuit so as to send the trouble contents as information to a registered communication station of a service company or the like. Thus, the contents of the trouble are adequately transmitted to the destination, thereby facilitating a grasp of the trouble contents in that destination. Accordingly, a service man can deal with the trouble appropriately by preparation of selecting required parts.

A facsimile device according a second aspect of the present invention includes a facsimile unit of users for transmitting information by a sending circuit via a telephone line and a facsimile unit of a maintenance and control station communicated with the facsimile unit of the users via the telephone line for performing maintenance of the facsimile unit of the users. The facsimile unit of the users includes a detecting circuit for detecting the condition of the facsimile unit itself, a trouble determining circuit for determining, when the detecting circuit detects occurrence of a trouble, whether or not contents of the trouble can be handled by the users, and a control circuit for controlling the sending circuit so as to send the trouble contents as communication information to the facsimile unit of the maintenance and control station in accordance with a request-to-send of the maintenance and control station when the trouble determining circuit determines that the trouble contents cannot be handled by the users. The facsimile unit of the maintenance and control station includes a receiving circuit for receiving communication information transmitted from the facsimile unit of the users and a printer for converting the communication information received by the receiving circuit into character information, to print out the converted information.

In operation, when a trouble occurs in the facsimile unit of the users, the trouble is detected by the detecting circuit, and then the trouble determining circuit determines whether or not contents of the trouble can be handled by the users. When the trouble determining circuit determines that the trouble contents cannot be handled by the users, the control circuit controls the sending circuit so as to send the trouble contents as information to the facsimile unit of the maintenance and control station. The sent information is received by the receiving circuit in the maintenance and control station. Then, the received information is converted into character information to be printed out. This causes a reduction in the time required for the users to communicate with the maintenance and control station. Since the maintenance and control station can immediately be informed of correct trouble information, the station can rapidly deal with the trouble and achieve an early recovery of the device from the trouble.

A concept of the present invention will now be described in detail with reference to FIG. 1. FIG. 1 is a conceptional diagram showing structure of a facsimile device according to a first view point of the present invention. With reference to FIG. 1, a facsimile unit 1 of users includes a detecting circuit 2 for detecting the condition of the unit itself, e.g., the occurrence of a trouble, the coming of the time to exchange specific parts, a nearly empty condition of consumables and so on. Detecting circuit 2 is connected with a temperature control circuit 9 and a main motor 10. Detecting circuit 2 is connected to a control circuit 3 including a trouble contents determining circuit 4, a trouble type determining circuit 5 and a communication information converting circuit 6. Control circuit 3 is connected with a sending/receiving circuit 7 and a display portion 8 of a display.

The above-described trouble contents determining circuit 4 serves to determine the contents of the trouble or the like detected by detecting circuit 2. Trouble type determining circuit 5 serves to determine whether or not the trouble or the like determined by trouble contents determining circuit 4 is of the type requiring a service man call. A trouble of the type requiring no service man call is, for example, a trouble which can be relatively easily handled by users by themselves, such as paper jamming and the like. Communication information converting circuit 6 serves to convert the contents of the trouble or the like determined by trouble contents determining circuit 4 into predetermined communication information and to supply the converted information as an output to sending/receiving circuit 7.

Sending/receiving circuit 7 serves to send originating source information or the like together with the foregoing communication information to a previously registered maintenance service station. This sending of the information is carried out in accordance with instructions from control circuit 3. Sending/receiving circuit 7 serves also to receive a request-to-send from the maintenance service station and transmit the received information to control circuit 3. Sending/receiving circuit 7 is connected with a laser printer 21 for making received image information visible. Control circuit 3 has a so-called polling function. That is, when a request-to-send is supplied from a maintenance service station, the control circuit determines whether or not the supplied request is transmitted from the previously registered maintenance service station. If the request is from the registered maintenance service station, the control circuit supplies a sending instruction to sending/receiving circuit 7 so as to send the above-described communication information, originating source information and the like to the maintenance service station.

Display portion 8 connected to control circuit 3 serves to display the trouble contents to inform the users of the displayed contents. As display methods, such methods are provided, for example, as lighting a predetermined lamp so as to simply show the occurrence of a trouble, distinguishing a trouble requiring a service man call from that requiring no service man call to display the troubles, displaying or lighting a mark corresponding to each trouble, and displaying a message corresponding to each trouble.

Temperature control circuit 9 serves to control temperatures of the surface of a heat roller for heating and fixing a toner image. Main motor 10 serves to drive a rotation system or the like.

A facsimile unit 11 of the service station includes a sending/receiving circuit 9. This sending/receiving circuit 9 serves to send a request-to-send to the above-described users, receive communication information and originating source information transmitted in accordance with this request and then output the received information to a printer 13. Printer 13 converts the communication information and the originating source information into character information and prints out the same.

FIG. 2 is a conceptional diagram showing structure of a facsimile device according to a second view point of the present invention. As shown in FIG. 2, when the facsimile unit of the maintenance and control station includes a counting circuit for counting the number of printed sheets, load of the users and the maintenance and control station is further alleviated.

Referring to FIG. 2, a detecting circuit 2 in a facsimile unit 1 of users is capable of counting the accumulated number of printed sheets as the condition of the unit itself. A communication information converting circuit 6 and a sending/receiving circuit 7 serve to convert a count value obtained by the counting into communication information and to send the converted information to the maintenance service station.

On the other hand, a sending/receiving circuit 12 of a facsimile unit 11 of the maintenance service station is connected with a charge calculating circuit 14. This charge calculating circuit 14 serves to subtract the number of printed sheets of a previous month in the facsimile unit 1 of the users from the information of the accumulated number of printed sheets obtained in sending/receiving circuit 12, to calculate the number of printed sheets of this month. The charge calculating circuit then accumulates a predetermined unit charge on the calculated number of printed sheets, to calculate a maintenance and control cost of this month.

Sending/receiving circuit 12 serves to convert the information of the calculated maintenance and control cost into communication information and to send the communication information to facsimile unit 1 of the users. Charge calculating circuit 14 is connected with a charge withdrawal system 15, so that the maintenance and control cost can be automatically withdrawn from a financial institution which is designated in advance between the users and the maintenance service station.

The flow of processing in a maintenance and control method of the facsimile device is shown briefly as follows. When the users receive a request to send the number of printed sheets from the maintenance service station by sending/receiving circuit 7, the users count the number of printed sheets by detecting circuit 2. This counted information is then converted into communication information by communication information converting circuit 6 and then transmitted to the maintenance service station by sending/receiving circuit 7. The maintenance service station recognizes the number of printed sheets by sending/receiving circuit 12 and supplies this number-of-sheets information as an output to the above-described charge calculating circuit 14. Charge calculating circuit 14 calculates a maintenance and control cost of this month. The station then sends this information to the users by sending/receiving circuit 12, to inform the users of the amount of bill and to ask payment of charges. Alternatively, the charges are automatically withdrawn by charge withdrawal system 15.

In the above structure, such a work for charge calculation becomes no longer required that a service man visits the users every month to check the number of sheets set in a counter of facsimile unit 1 of the users. This enables a reduction in labor cost and maintenance and control cost.

When the automatic sending/receiving is carried out between facsimile unit 1 of the users and that of the maintenance service station as described above, this transmission is carried out irrespectively of the intention of the users. Therefore, if there is no display at all, the users are liable to make a hasty deduction that abnormality takes place in the facsimile unit. Thus, a display such as "under calculation of maintenance cost" or "under transmission of calculated charges", for example, may be provided on display portion 8, or alternatively a predetermined signal sound may be supplied as an output during the automatic sending/receiving period. Such a display, signal sound and so on are also available in the foregoing facsimile device according to the first view point of the present invention. In this case, a display such as "under transmission of trouble contents" is made.

According to a third aspect of the present invention, a maintenance and control method of a facsimile device includes the steps of: detecting a self-condition of a facsimile unit of users, converting the detected self-condition into communication information, sending the converted communication information to a facsimile unit of a maintenance and control station in accordance with a request-to-send from the maintenance and control station, receiving the communication information sent to the facsimile unit of the maintenance and control station, and converting the received communication information into character information so as to print out the character information.

In operation, since the facsimile unit of the users per se sends contents of a trouble or the like to the maintenance and control station in accordance with a request-to-send from the maintenance and control station, it is possible to eliminate a time loss occurring when the users communicate with the maintenance and control station. It is also possible to avoid an erroneous explanation of trouble contents, which is made through people. In addition, even when the users do not notice the occurrence of the trouble, the maintenance and control station can surely be informed of the trouble contents.

Since the maintenance and control station can acquire correct trouble information, the station can appropriately cope with the trouble and achieve an early recovery of the facsimile device from the trouble. This enables a significant reduction in inoperable time of the facsimile device due to the trouble. Moreover, when the station acquires the information of nearly empty and the information of a request-to-exchange parts, for example, the station can also prepare the required parts (consumables) or the like before receiving in practice the request-to-exchange the parts or the like from the users. Furthermore, it becomes possible for the maintenance and control station to hand the users parts or the like, which would be necessary in the near future, before a trouble occurs when visiting neighboring users of those users. Thus, it is also possible to eliminate a waste of time and cost imposed on service men who frequently come and go between the users. In addition, the users are no longer required to pay attention to the exchange time of consumables, the stock of the consumables, the communication with the maintenance service station to prepare stocks and so on. This makes it possible to reduce the load put on the users and the maintenance service station with respect to a control over the consumables.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
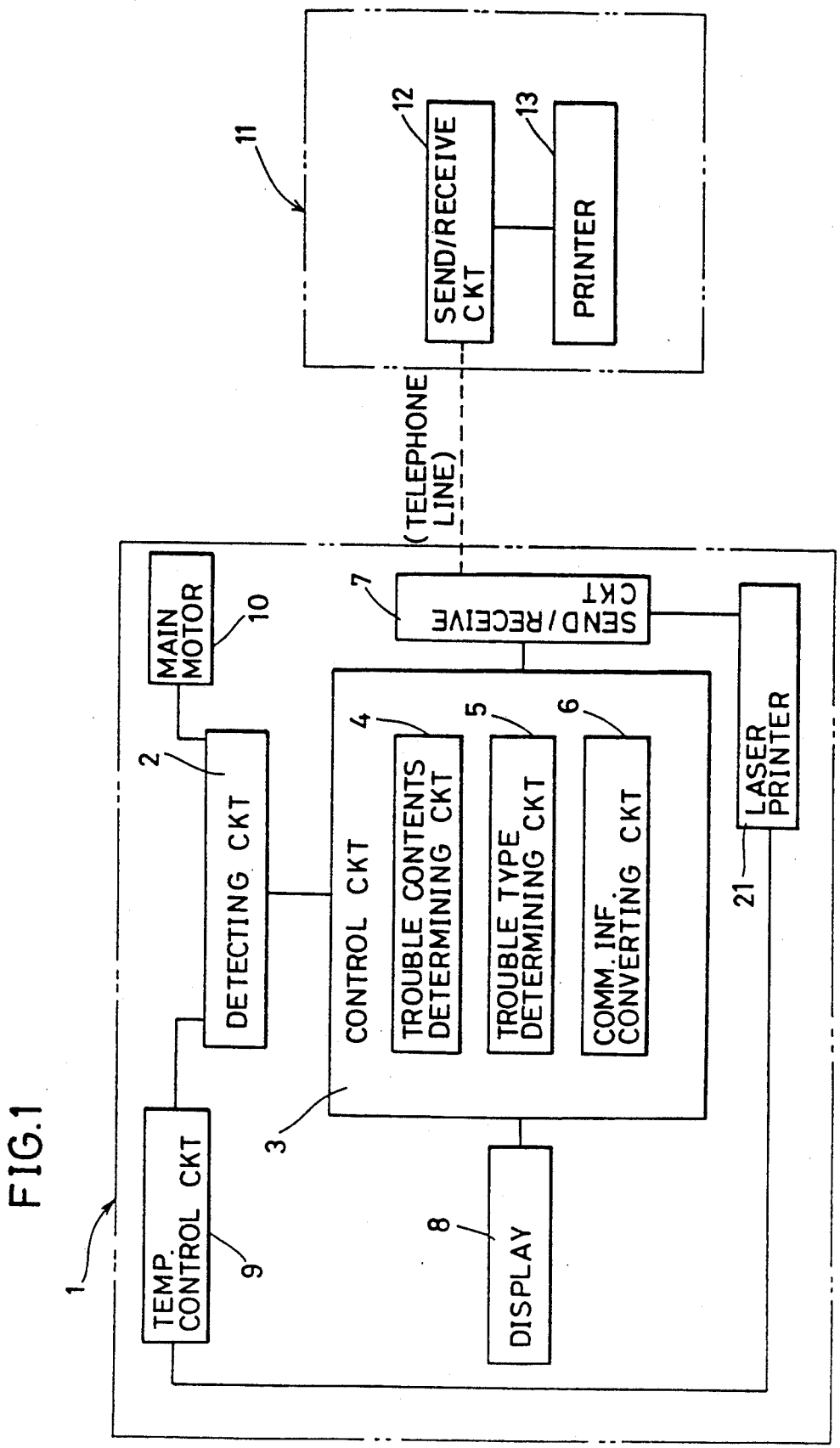
FIG. 1 is a conceptional diagram showing structure of a facsimile device according to a first view point of the present invention.
Figure 2:
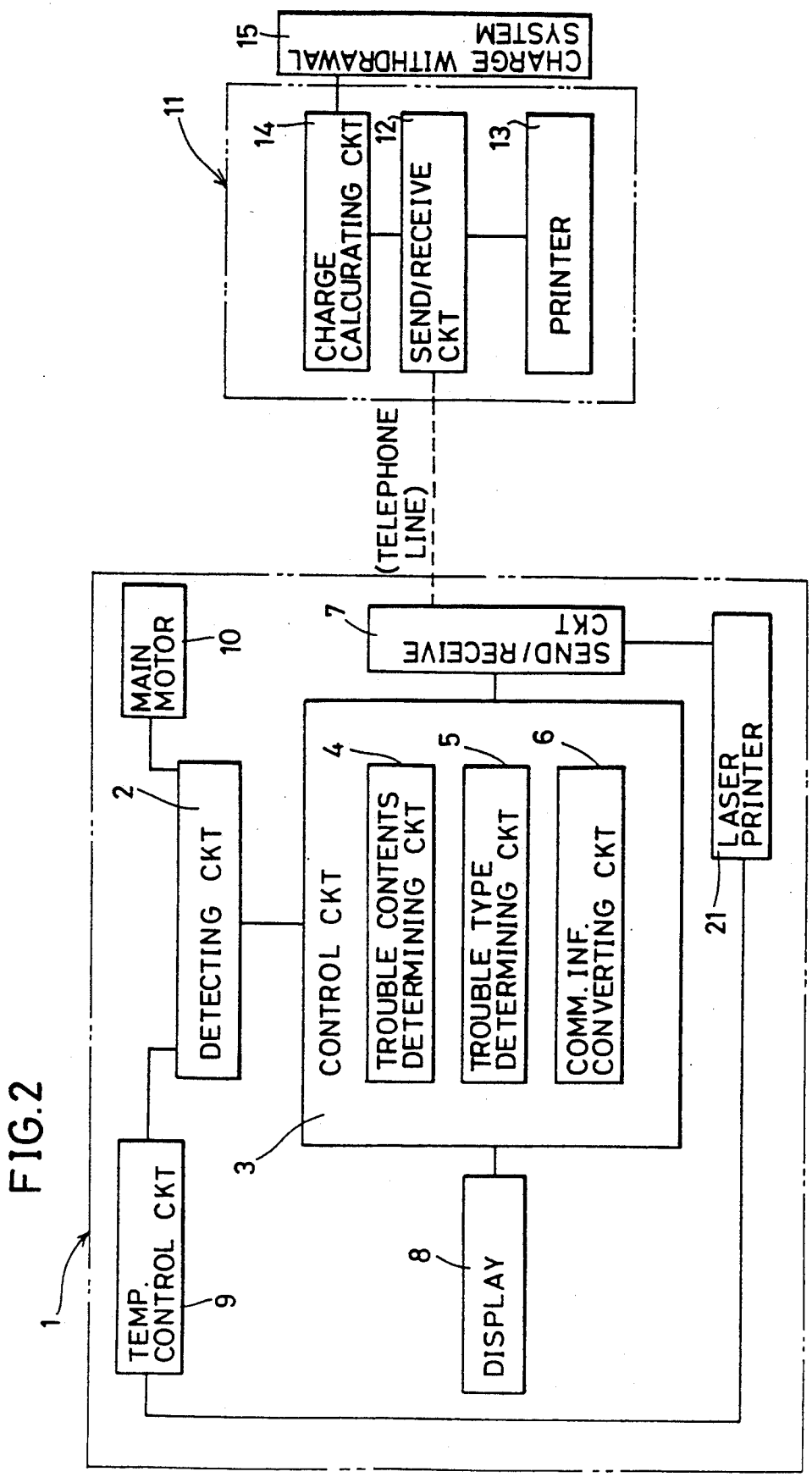
FIG. 2 is a conceptional diagram showing structure of a facsimile device according to a second view point of the present invention.

A description will now be given on the structure of a facsimile device of one embodiment, with reference to FIG. 3. The facsimile device according to this embodiment includes a laser printer 21. Laser printer 21 includes in its upper portion a laser beam source 22 and an optical system 23 including a polygon mirror, an F-θ lens, a mirror and so on. A laser beam emitted from laser beam source 22 is scanned on a photoreceptor drum 24 located beneath laser beam source 22 by optical system 23.

Photoreceptor drum 24 is held rotatably. A charger 25, a developing device 26, a transfer device 27, a cleaning device 28 and the like are provided around photoreceptor drum 24. Uniform electric charges are previously supplied onto the surface of photoreceptor drum 24 by charger 25, and an electrostatic latent image is formed on the surface in accordance with the above-described optical scanning. The electrostatic latent image formed on photoreceptor drum 24 is developed by developing device 26 and then transferred as a toner image on paper, which is transported from a paper feed cassette 42 by a transport device 40, by transfer device 27. The paper, having the toner image transferred thereon, is transported by a transport device 29 to a fixing device 32 including heat rollers 30 and 31. The toner image is heated and fixed in fixing device 32 and then discharged. Photoreceptor drum 24, after going through the transfer process, has toners, adhering on its surface, removed by cleaning device 28. In addition, the facsimile device of this embodiment includes various detecting switches as follows. That is, a remaining paper detecting switch S1, for outputting a detecting signal when the remaining amount of transfer paper stocked in paper feed cassette 42 reaches a predetermined amount, is provided in paper feed cassette 42. A remaining toner detecting switch S2, for outputting a detecting signal when the remaining amount of toners reaches a predetermined amount, is provided in developing device 26. A motor abnormality detecting switch S3 for outputting a detecting signal when detecting abnormal operation of a main motor 10 is connected with main motor 10. A temperature abnormality detecting switch S4 for detecting abnormal temperatures of heat roller 30 is provided in a temperature control circuit 9 of heat roller 30, which will be described later. A disconnection signal outputting switch S5 for outputting a disconnection detecting signal of a thermistor 14 is provided in temperature control circuit 9. A number-of-printed sheets counting switch S6 for outputting a counting signal for counting the number of printed sheets is provided in paper feed cassette 42.

A description will now be given on structure of a control circuit of a facsimile device 1 shown in FIG. 3, with reference to FIG. 4. First, a CPU 100 performing an operation processing is connected with a ROM 101 for storing various control programs. CPU 100 is also connected with a RAM 102 for temporarily storing results of the operation processing by CPU 100. CPU 100 is further connected with an I/O circuit 103 for inputting and outputting data. The I/O circuit is connected with the above-described remaining paper detecting switch S1, remaining toner detecting switch S2, motor abnormality detecting S3, temperature abnormality detecting switch S4, disconnection signal outputting switch S5 and number-of-printed sheets counting switch S5. A sending/receiving circuit 7 and a display portion 8 are also connected to I/O circuit 8.

Figure 3:
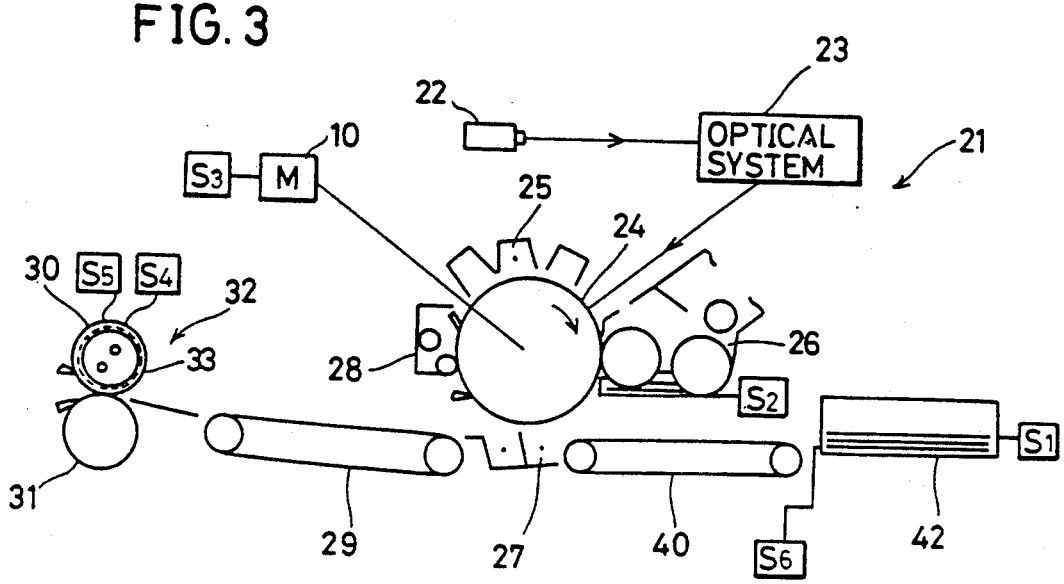
FIG. 3 is a schematic diagram showing structure of a facsimile device according to one embodiment of the present invention.
Figure 4:
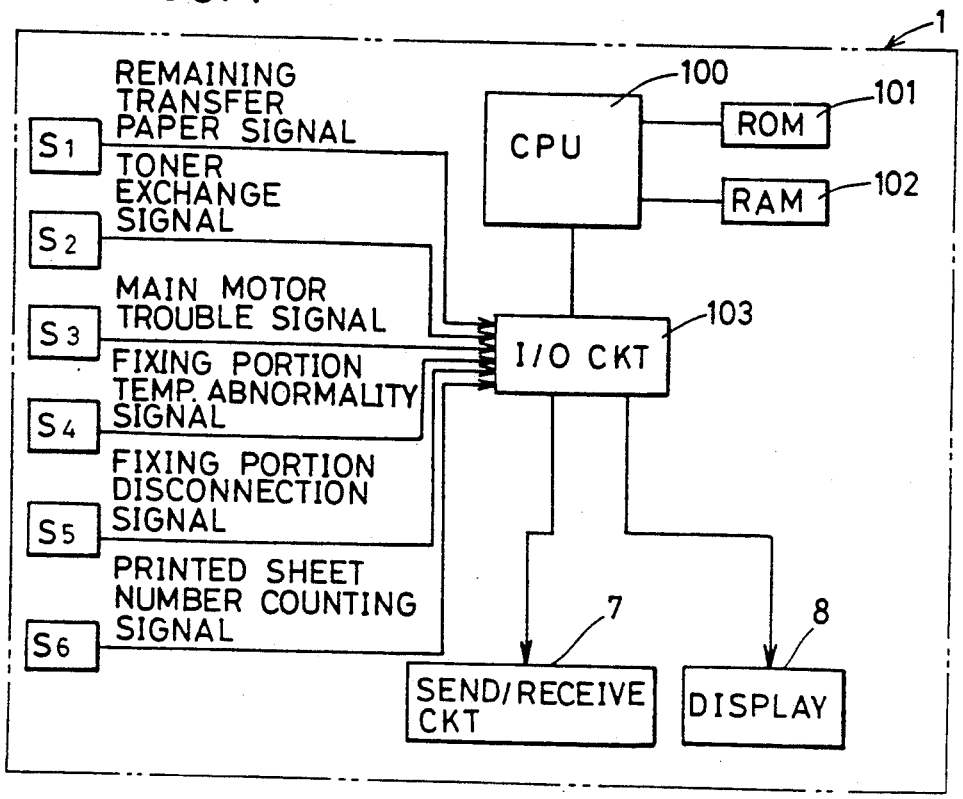
FIG. 4 is a block diagram showing a control circuit of the facsimile device shown in FIG. 3.
Figure 5:
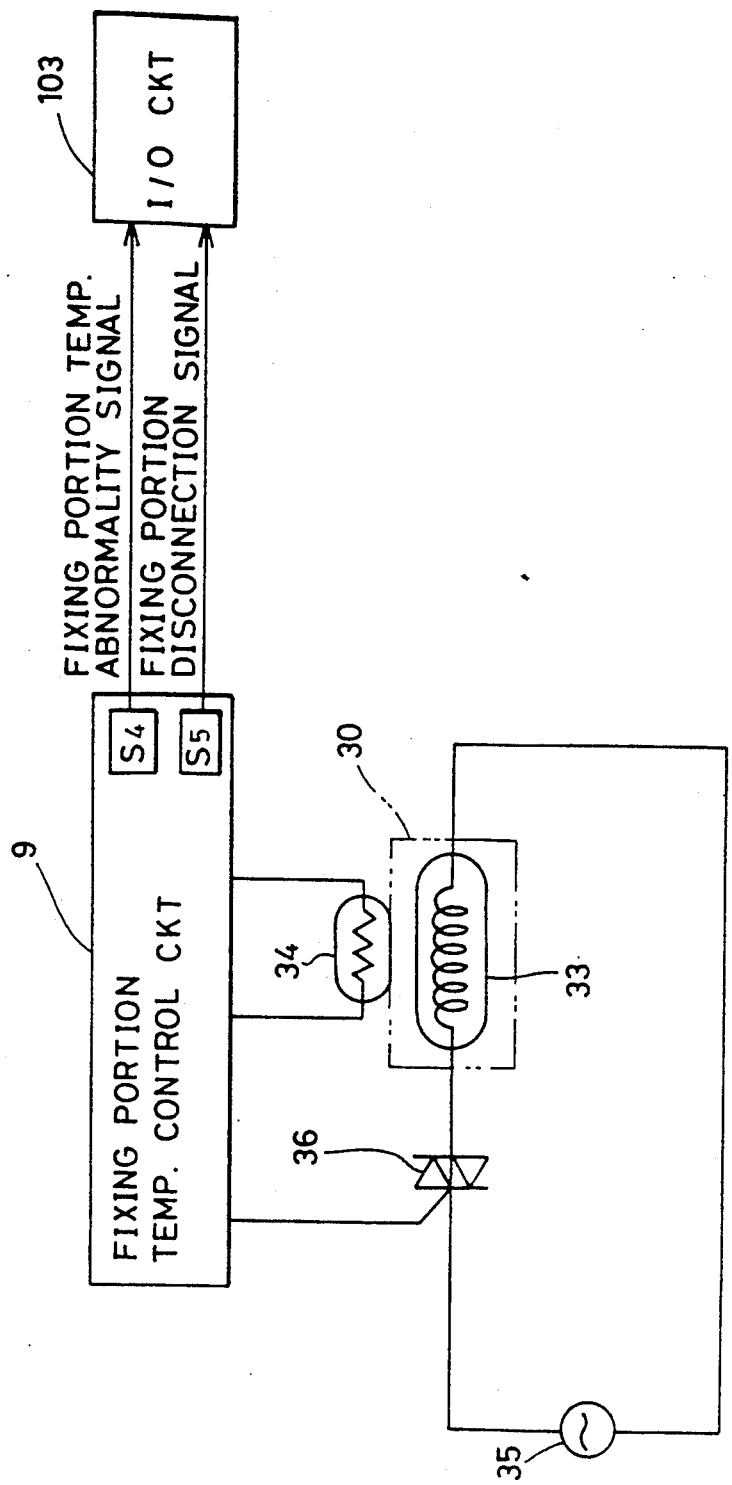
FIG. 5 is a circuit diagram showing a temperature control system of a heat roller of a laser beam printer shown in FIG. 3.

With reference to FIG. 5, heat roller 30 shown in FIG. 3 includes a heater lamp 33 therein and thermistor 34 welded with pressure on the surface of heat roller 30. Heater lamp 33 has one end connected to an alternating current power source (hereinafter referred to as AC power source) 35 and the other end connected to one end of a triac 36. Triac 36 has the other end connected to AC power source 35 and a gate terminal thereof connected to temperature control circuit 9. Thermistor 34 has opposite ends connected to temperature control circuit 9. Heater lamp 33 generates heat for fixing. Thermistor 34 serves to detect a surface temperature of heat roller 30 by its temperature-resistance characteristics.

Temperature control circuit 9 controls an ON/OFF state of triac 36 in accordance with the surface temperature of heat roller 30 detected by thermistor 34, thereby controlling an ON/OFF state of heater lamp 33. The surface temperature of heat roller 30 is thus controlled to be a predetermined temperature. When the surface temperature of heat roller 30 does not reach a predetermined temperature within a definite time upon raising the surface temperature thereof, temperature control circuit 9 detects abnormality of a low temperature and then transmits a detecting signal thereof through temperature abnormality detecting switch S4 to I/O circuit 103 (see FIG. 4).

In a temperature control system as shown in FIG. 3, when a disconnection of thermistor 34 occurs, resistance values of thermistor 34 become infinite despite an appropriate surface temperature of heat roller 30. Accordingly, heater lamp 33 is supplied with an excessive power by control of temperature control circuit 9 and, in the worst case, the heater lamp might ignite. Thus, temperature control circuit 9 causes microcurrents to flow through thermistor 34, so as to determine conduction/non-conduction of thermistor 34 and detect the disconnection. Then, the temperature control circuit transmits a detecting signal of the disconnection through disconnection signal outputting switch S5 to I/O circuit 103 (see FIG. 4).

In the foregoing structure, when thermistor 34 is disconnected due to a shake or the like caused by rotation of heat roller 30, temperature control circuit 9 detects the disconnection of thermistor 34 and transmits the detecting signal of the disconnection through disconnection signal outputting switch S5 to I/O circuit 103. When the surface temperature of heat roller 30 does not rise due to the disconnection of heat roller 30 or the like, temperature control circuit 9 detects the abnormality of the low temperature and transmits a detecting signal of the abnormal low temperature through temperature abnormality detecting switch S4 to I/O circuit 103. In a driving system, when foreign matters are interposed in a driving gear or the like not shown, main motor 10 is locked so as not to output constant speed pulses.

A determination is made that such troubles as abnormalities in temperature of heat roller 30 and in operation of main motor 10 cannot be handled by an operator, in accordance with the detecting signal or the like applied from each portion through I/O circuit 103 by CPU 100. Also, contents of such troubles is displayed on display portion 8 of a display or the like and also transmitted as image information to a maintenance service station by sending/receiving circuit 7. A service man in the maintenance service station then handles the trouble based on the information sent from the place where the troubles occur.

Figure 6:
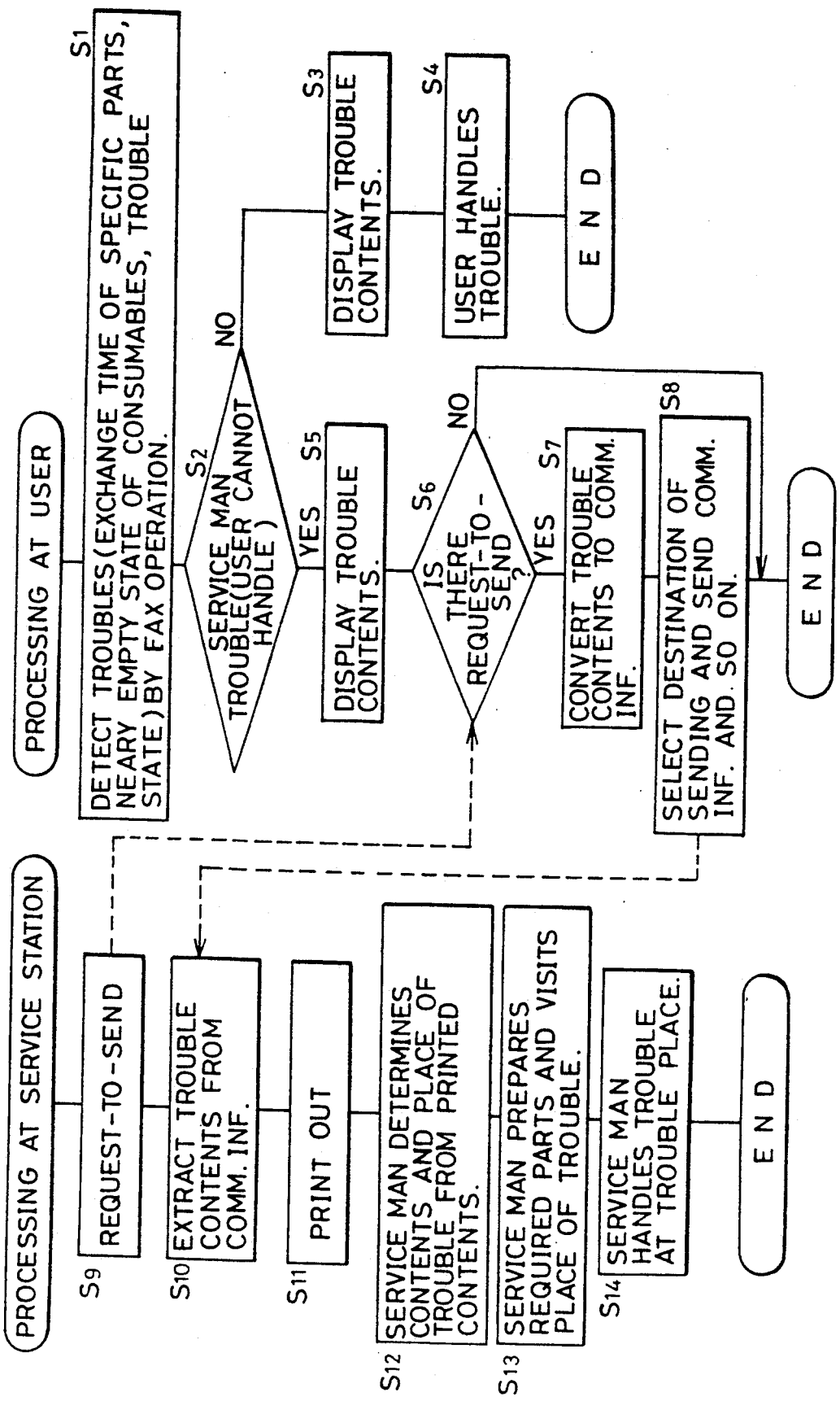
FIG. 6 is a flow chart for explaining the flow of processing in a maintenance and control method of the facsimile device of the present invention.

A brief description will now be given on the flow of processing in a maintenance and control method of the facsimile device with reference to FIG. 6. When a trouble or the like occurs in facsimile unit 1 in a processing by users (S1), the occurrence of the trouble or the like is detected by detecting switches S1–S6. Contents of the trouble is then determined by CPU 100. Also, a determination is made as to whether or not the trouble contents requires a service man call (S2). When the trouble is of the type requiring no service man call, the trouble contents determined by CPU 100 is transmitted to display portion 8 of a display or the like. Display portion 8 displays a mark, a message or the like corresponding to the trouble contents (S3). The users are informed of the trouble contents by the display and handle the trouble by themselves (S4).

Conversely, when the trouble is of the type requiring a service man call, the trouble contents determined by CPU 100 is displayed on display portion 8, as described above (S5). A determination is then made as to whether or not a request-to-send is provided (S6). When the request is not provided, the processing is terminated. When the request is provided, however, the trouble content is converted into predetermined communication information (S7). Then, a transmission destination is selected, and the communication information and originating source information are sent by sending/receiving circuit 7 to the selected destination (S8).

At the maintenance service station, sending/receiving circuit 12 supplies a request-to-send to the facsimile unit of the users (S9). Then, the trouble contents and the originating source are extracted from the received communication information and originating source information (S10). The extracted trouble contents and originating source are converted into character information and then printed out on paper by printer 13 (S11). A service man at the maintenance service station determines the place where the trouble occurs and the trouble contents or the like from the printed-out contents (S12). Then, the service man procures necessary parts and visits the place where the trouble occurs (S13), to carry out a trouble processing (S14).

The foregoing method, in which facsimile unit 1 of the users per se transmits the trouble contents to the maintenance service station in accordance with the request-to-send from the service station, enables elimination of time loss produced when the users communicate with the station. The method also makes it possible to avoid incorrect explanations of the trouble contents, caused when the content is transmitted through people and also to ensure the communication of the trouble contents for the maintenance service station even when the users fail to recognize the occurrence of the trouble.

Since the maintenance service station can acquire correct trouble information, the station can handle the trouble appropriately and achieve an early recovery from the trouble. This enables a significant reduction in inoperable time of the facsimile device due to the trouble. When the service station acquires the information of nearly empty and the information of a request to exchange parts, for example, the station can also procure the parts (consumables) and the like before receiving the request to exchange the parts and the like from the users. Further, the service man from the station can hand the parts and the like, which would be required in the near future, to the users in advance when visiting users neighboring of the present users. This enables the service man to eliminate a waste of time and cost produced when frequently coming and going among the users. Moreover, it becomes unnecessary for the users to pay attention to the time to exchange the consumables, the stock of the consumables, the communication with the maintenance service station to prepare stocks and so on. Thus, load of the users and the maintenance service station with respect to the control over the consumables can be alleviated.

The detection of the trouble contents or the like may be carried out at two stages: one is detection of the trouble contents as the usual information of nearly empty and the information of a request to exchange the parts; and the other is detection of the trouble contents at a slightly earlier stage than the former detection. In this case where the detection at the earlier stage is carried out, information indicating that a request to change the parts or the like would occur in the near future is transmitted to the maintenance service station. In this manner, the maintenance service station can organize its maintenance system according to plan in the form of foreknowing a service man call, resulting in a still faster dealing with the trouble.

Figure 7:
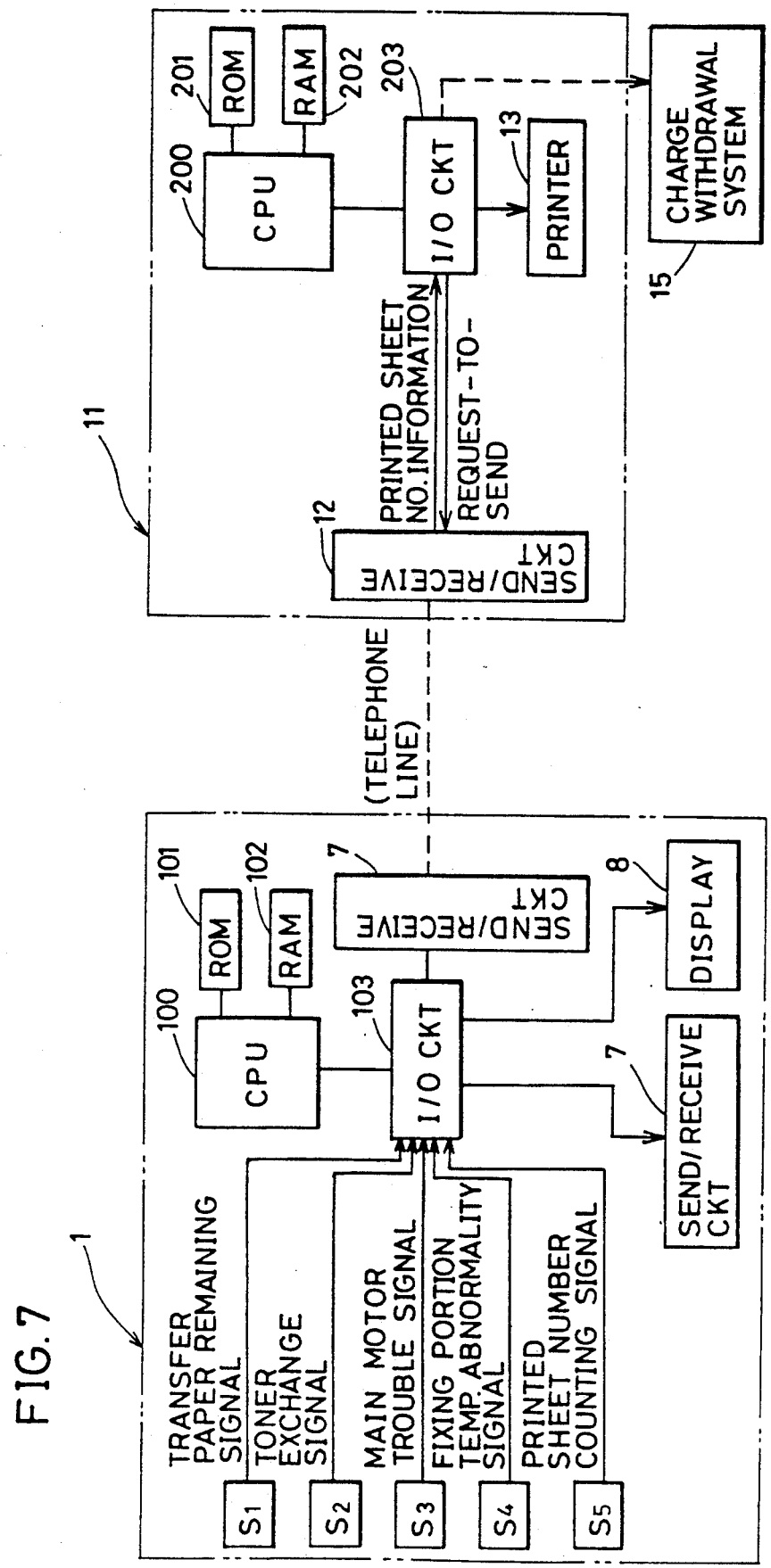
FIG. 7 is a schematic diagram showing structure of a facsimile device according to another embodiment of the present invention.

Another embodiment of the present invention will now be described with reference to FIG. 7. This embodiment is a facsimile device capable of calculating charges corresponding to the number of printed sheets by employing a number-of-printed sheets counting switch S5 provided in a facsimile unit 1 of users. As described above, facsimile unit 1 of users includes the number-of-printed sheets counting switch S5 for counting the number of printed sheets. A signal of switch S5 is added sequentially by a CPU 100 through an I/O circuit 103, so that the accumulated number of printed sheets is calculated. The information of the accumulated number of sheets is transmitted to a facsimile unit 11 of a maintenance and service station by a sending-/receiving circuit 7 in accordance with a request-to-send from the service station.

Facsimile device 11 of the maintenance service station includes a CPU 200 for performing an operation processing. CPU 200 is connected with a ROM 201 for storing various control programs and a RAM 202 for temporarily storing results of the operation processing or the like by CPU 200. CPU 200 is also connected with an I/O circuit 203 for inputting and outputting data. I/O circuit 203 is connected with a printer 13 and a sending/receiving circuit 12. I/O circuit 203 is also connected with a charge withdrawal system 15. In this structure, the information of the number of printed sheets transmitted from facsimile unit 1 of the users is received by sending/receiving circuit 12. This received information is sent through I/O circuit 203 to CPU 200. CPU 200 performs an operation processing for calculation of charges according to a charge calculation program stored in advance in ROM 201. Thus, a maintenance and control cost is calculated. The calculated maintenance and control cost is transmitted to facsimile unit 1 of the users by sending/receiving circuit 12. The maintenance and control cost is automatically withdrawn from financial institutions designated in advance between the service station and the users by charge withdrawal system 15 connected to I/O circuit 203.

According to the foregoing structure, such a work for charge calculation, it is no longer required that a service man visits the users every month, to check the number of printed sheets on a counter of facsimile unit 1 of the users. Therefore, a reduction in labor cost and maintenance and control cost can be achieved.

When such an automatical sending/receiving is carried out between facsimile unit 1 of the users and that of the maintenance service station, this automatic transmission is carried out irrespective of the intention of the users. Therefore, if there is no display at all, the users are liable to make a quick deduction that abnormality occurs in the facsimile unit. Thus, such a display as "under calculation of maintenance cost" or "under transmission of calculated charges", for example, may be made on display portion 8, or alternatively, a predetermined signal sound may be supplied as an output, during the automatic sending/receiving. The display, the signal sound and so on can also be utilized in the maintenance and control method of the facsimile device of the first embodiment. In this case, a display of "under transmission of trouble contents" or the like is made.

As has been described heretofore, the facsimile device of the present invention includes detecting means for detecting a self-condition, trouble determining means for determining, when the detecting means detects that a trouble occurs, whether or not contents of the trouble can be handled by an operator, and control means for controlling sending means so as to send the trouble contents as information to a previously registered communication destination when the trouble determining means determines that the trouble contents cannot be handled by the operator.

The foregoing structure of the facsimile device makes it possible to adequately transmit the trouble contents to a communication station of a service company or the like when the contents of the trouble cannot be handled by the operator. This enables a service man to easily grasp the contents of the trouble and to appropriately cope with the trouble. Therefore, the facsimile device in accordance with the present invention provides such effects that an inoperable time of the device due to the trouble can be considerably reduced, and the efficiency of maintenance can be achieved. Consequently, a waste of time and cost with respect to the operator and the communication station can be eliminated.

In addition, the facsimile device of the present invention includes a facsimile unit of users for sending information through a telephone line by sending means and a facsimile unit of a maintenance and control station communicated with the facsimile unit of the users through the telephone line for performing maintenance of the facsimile unit of the users. The facsimile unit of the users includes detecting means for detecting a self-condition, trouble determining means for determining, when the detecting means detects occurrence of a trouble, whether or not contents of the trouble can be handled by the users, and control means for controlling the sending means so as to send the trouble contents as communication information to the facsimile unit of the maintenance and control station in accordance with a request-to-send from the maintenance and control station when the trouble determining means determines that the trouble contents cannot be handled by the users. The facsimile unit of the maintenance and control station includes receiving means for receiving communication information sent from the facsimile unit of the users and printing means for converting the communication information received by the receiving means into character information, to print out the converted information.

This structure enables a reduction in the time required for the users to communicate with the maintenance and control station. Since the maintenance and control station can immediately obtain correct trouble information, the station can rapidly deal with the trouble and achieve an early recovery of the device from the trouble. This makes it possible to reduce time load and economic load casted on the users and the maintenance and control station.

In the maintenance and control method of the facsimile device of the present invention, a facsimile unit of users detects a self-condition, then converts detected contents into communication information and transmits the converted information to a maintenance and control station in accordance with a request-to-send from the station, while the maintenance and control station receives the transmitted communication information, then converts the received information into character information and prints out the converted information.

This structure provides such effects that the users can eliminate a time loss and a work loss caused upon communication of the trouble contents, while the maintenance and control station can obtain correct trouble information and carry out a correct and fast maintenance work.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A facsimile device for sending information through a telephone line by a sending device, comprising:
   detecting means for detecting problems which hinder adequate operation of the facsimile device;
   trouble determining means for determining, when said detecting means detects occurrence of a problem, whether or not the problem can be handled by an operator of the facsimile device; and
   control means for controlling the sending device, in response to said trouble determining means determining that the problem cannot be handled by the operator, to automatically send contents of the problem as communication information to a predetermined communication destination.

2. The facsimile device of claim 1, wherein
   said trouble determining means includes trouble contents determining means for determining the contents of the problem detected by said detecting means, and trouble type determining means for determining whether or not the contents of said problem can be handled by the operator in accordance the determination of said trouble contents determining device.

3. The facsimile device of claim 1, wherein
   said control means includes communication information converting means for, when said trouble determining means determines that the contents of the problem cannot be handled by said operator, converting the trouble contents into predetermined communication information, and for supplying the predetermined communication information to said sending means.

4. The facsimile device of claim 1, further comprising:
   display means for displaying the problem contents determined by said trouble determining means.

5. The facsimile device of claim 1, wherein
   said detecting means includes detecting signal generating means for generating a detecting signal prior to consumables of the facsimile device being deteriorated or consumed by use of said facsimile device.

6. The facsimile device of claim 1, wherein
   said detecting means includes means for detecting mechanical and electrical problems.

7. The facsimile device of claim 1, wherein said detecting means includes a plurality of switches, each for detecting occurrence of a different problem which hinders adequate operation of the facsimile device.

8. The facsimile device of claim 7, wherein at least one of said switches detects absence of paper in the facsimile device.

9. The facsimile device of claim 7, wherein at least one of said switches detects abnormalities in a motor of the facsimile device.

10. The facsimile device of claim 7, wherein at least one of said switches detects abnormalities in a printer of the facsimile device.

11. A system including a facsimile unit of a user for sending information through a telephone line by a sending device and a facsimile unit of a maintenance and control station communicable with the facsimile unit of the user through the telephone line, for automatically communicating maintenance information from the facsimile unit of the user,
    said facsimile unit of the user including detecting means for detecting problems which hinder adequate operation of the facsimile unit of the user, trouble determining means for determining, when said detecting means detects occurrence of a problem, whether or not the problem can be handled by the user, and
    control means for controlling said sending device, in response to said trouble determining means determining that the problem cannot be handled by the user, to automatically send contents of the problem as communication information to said facsimile unit of said maintenance and control station in accordance with a request-to-send signal automatically sent from said maintenance and control station,
    said facsimile unit of said maintenance and control station including
    receiving means for receiving the communication information sent from said facsimile unit of said user, and
    printing means for converting the communication information received by said receiving means into character information, and printing the converted information.

12. The facsimile device of claim 11, wherein
    said facsimile unit of said user further includes display means for displaying the problem contents determined by said trouble determining means.

13. The facsimile device of claim 11, wherein
    said detecting means included in said facsimile unit of said user includes detecting signal generating means for generating a detecting signal prior to consumables of the facsimile unit of the user being deteriorated or consumed by use of said facsimile unit of said user.

14. The facsimile device of claim 11, wherein
    said detecting means included in said facsimile unit of said user includes means for detecting mechanical and electrical problems.

15. The facsimile device of claim 11, wherein
    said facsimile unit of said user further includes counting means for counting a number of sheets printed by the facsimile unit; and
    said facsimile unit of said maintenance and control station includes charge calculating means for, when communication information of a printed sheet number count evaluated by said counting means is sent to said maintenance and control station by said sending device, recognizing said counted number of printed sheets to perform a predetermined charge calculation in accordance with the communication information of said printed sheet number count.

16. The facsimile device of claim 15, wherein said charge calculating means further includes charge withdrawal means for withdrawing charges calculated by said charge calculating means from a financial institution previously designated between the user and the maintenance and control station.

17. A maintenance and control method of a facsimile device employing a facsimile unit of a user for sending information through a telephone line by a sending device and a facsimile unit of a maintenance and control station communicable with said facsimile unit of said user through the telephone line for automatically communicating maintenance information from the facsimile unit of said user, said method comprising the steps of:

detecting problems which hinder adequate operation of the facsimile unit of the user;

determining, when a problem has been detected, whether or not the detected problem can be handled by the user;

converting the detected problem into communication information when it has been determined that the detected problem cannot be handled by the user;

sending the communication information to said facsimile unit of said maintenance and control station in accordance with a request-to-send signal automatically sent from the maintenance and control station;

receiving the communication information sent to the facsimile unit of the maintenance and control station; and converting said received communication information into character information outputting the character information so as to automatically receive information, at the maintenance and control station, concerning problems of the facsimile unit of the user.

18. The method of claim 17, wherein
said detecting step includes the step of generating a detecting signal prior to consumables of the facsimile unit of the user being deteriorated or consumed by user of said facsimile unit of the user.

19. The method of claim 17, further comprising the steps of displaying the problem detected by said detecting step.

20. The method of claim 17, further comprising the step of:
printing the output character information.

21. The method of claim 17, further comprising the step of:
displaying the output character information.

* * * * *